(12) United States Patent
Fenton et al.

(10) Patent No.: US 12,319,596 B2
(45) Date of Patent: *Jun. 3, 2025

(54) WATER TREATMENT DISPENSING APPARATUS

(71) Applicant: Crosstex International, Inc., Hauppauge, NY (US)

(72) Inventors: Thomas L. Fenton, Minneapolis, MN (US); Jamie Krull, Minneapolis, MN (US); Michael W. McKeand, Minneapolis, MN (US); Christopher Werthman, Minneapolis, MN (US)

(73) Assignee: CROSSTEX INTERNATIONAL, INC.

( * ) Notice: Subject to any disclaimer, the term of this patent is extended or adjusted under 35 U.S.C. 154(b) by 434 days.

This patent is subject to a terminal disclaimer.

(21) Appl. No.: 17/841,115

(22) Filed: Jun. 15, 2022

(65) Prior Publication Data

US 2022/0363569 A1    Nov. 17, 2022

Related U.S. Application Data

(62) Division of application No. 16/757,480, filed as application No. PCT/US2018/056991 on Oct. 23, 2018, now Pat. No. 11,365,135.

(Continued)

(51) Int. Cl.
*C02F 1/28*      (2023.01)
*A61C 1/00*     (2006.01)
(Continued)

(52) U.S. Cl.
CPC ............. *C02F 1/42* (2013.01); *A61C 1/0076* (2013.01); *B01D 24/007* (2013.01);
(Continued)

(58) Field of Classification Search
CPC .. C02F 1/42; C02F 1/285; C02F 1/288; C02F 1/50; C02F 1/685; C02F 1/766;
(Continued)

(56) References Cited

U.S. PATENT DOCUMENTS

| 1,637,095 A | 7/1927 | Walters |
| 3,490,580 A | 1/1970 | Brumfield et al. |

(Continued)

FOREIGN PATENT DOCUMENTS

| CA | 2146122 C | * | 2/2005 | ........... A61C 1/0076 |
| CN | 1086701 | | 5/1994 | |

(Continued)

OTHER PUBLICATIONS

International Preliminary Report on Patentability issued in PCT/US2018/056991, mailed May 7, 2020.

(Continued)

*Primary Examiner* — Joseph W Drodge
(74) *Attorney, Agent, or Firm* — MARSHALL, GERSTEIN & BORUN LLP (57) ABSTRACT

A cartridge for use in a water purification apparatus and a water purification method for maintaining a water quality supply are provided. The cartridge comprises an elongated tubular body having first and second ends comprising a fluid inlet and a fluid outlet, and an internal chamber extending between the first and second end. The first end includes an end cap having a first opening in fluid communication with the body. A disinfectant material is disposed in the internal chamber of the body. Filters are disposed in the elongated tubular body adjacent to the first opening and adjacent the second end of the elongated tubular body and are in fluid communication with the internal chamber and the fluid outlet. The second end of the elongated tubular body com- (Continued)

prising an exterior surface having a tapered portion and a linear portion adjacent to the tapered portion.

17 Claims, 9 Drawing Sheets

Related U.S. Application Data (60) Provisional application No. 62/576,169, filed on Oct. 24, 2017.

(51) Int. Cl.
| | | |
|---|---|---|
| *B01D 24/00* | (2006.01) | |
| *B01D 27/14* | (2006.01) | |
| *C02F 1/42* | (2023.01) | |
| *C02F 1/50* | (2023.01) | |
| *C02F 1/68* | (2023.01) | |
| *C02F 1/76* | (2023.01) | |
| *C02F 103/02* | (2006.01) | |

(52) U.S. Cl.
CPC ............ *B01D 27/146* (2013.01); *C02F 1/285* (2013.01); *C02F 1/288* (2013.01); *C02F 1/50* (2013.01); *C02F 1/685* (2013.01); *C02F 1/766* (2013.01); *B01D 2201/29* (2013.01); *C02F 2001/422* (2013.01); *C02F 1/505* (2013.01); *C02F 2103/026* (2013.01); *C02F 2201/006* (2013.01); *C02F 2307/02* (2013.01)

(58) Field of Classification Search
CPC ............... C02F 1/505; C02F 2001/422; C02F 2103/026; C02F 2201/006; C02F 2307/02; C02F 1/001; C02F 2201/004; C02F 2307/14; C02F 1/76; C02F 9/20; C02F 1/283; C02F 1/68; C02F 1/686; C02F 1/687; C02F 2303/04; C02F 2307/10; A61L 2/16; A61L 2/23; A61L 2/238; A61L 2202/122; A61L 2209/133; A61L 2/002; A61L 2202/24; A61C 1/0061; A61C 1/0076; A61C 2/16; A61C 2/23; A61C 2/238; A61C 19/002; B01D 24/008; B01D 27/08; B01D 24/007; B01D 2201/291; B01D 2201/4061; B01D 24/38; B01D 24/42; B01D 27/146; B01D 29/56; B01D 2201/29; B01D 2201/295; B01D 2201/301; B01D 2201/302; B05B 7/00; B05B 7/0025

See application file for complete search history.

(56) References Cited

U.S. PATENT DOCUMENTS

| | | | |
|---|---|---|---|
| 3,788,476 A | 1/1974 | Othmer | |
| 4,238,477 A | 12/1980 | Fina et al. | |
| 4,741,697 A | 5/1988 | Herbison | |
| 5,073,382 A | 12/1991 | Antelman | |
| 5,176,836 A | 1/1993 | Sauer et al. | |
| 5,223,149 A | 6/1993 | Antelman | |
| 5,230,624 A | 7/1993 | Wolf et al. | |
| D351,892 S | 10/1994 | Wolf et al. | |
| 5,370,534 A | 12/1994 | Wolf et al. | |
| 5,401,399 A | 3/1995 | Magnusson et al. | |
| 5,474,451 A * | 12/1995 | Dalrymple | A61L 2/24 433/80 |
| 5,556,279 A | 9/1996 | Wolf et al. | |
| 5,882,507 A | 3/1999 | Tanner et al. | |
| 6,080,313 A | 6/2000 | Kelada | |
| 6,254,894 B1 | 7/2001 | Denkewicz, Jr. et al. | |
| 6,267,887 B1 | 7/2001 | Hughes et al. | |
| 6,325,929 B1 | 12/2001 | Bassett | |
| 6,562,241 B1 | 5/2003 | Gritton et al. | |
| 6,616,197 B2 | 9/2003 | Sampson | |
| 6,821,414 B1 | 11/2004 | Johnson et al. | |
| 6,863,905 B1 | 3/2005 | Shanbrom | |
| 7,250,111 B2 | 7/2007 | Doxey et al. | |
| 7,329,385 B1 | 2/2008 | Radicone et al. | |
| 7,481,917 B2 | 1/2009 | Ikeyama et al. | |
| 7,491,330 B2 | 2/2009 | Harvey | |
| 7,704,399 B2 | 4/2010 | Condit et al. | |
| 8,252,185 B2 | 8/2012 | Rajan et al. | |
| 8,318,011 B2 | 11/2012 | O'Brien et al. | |
| 8,425,771 B2 | 4/2013 | O'Brien et al. | |
| 9,750,834 B1 | 9/2017 | Hammarback | |
| 9,994,459 B2 | 6/2018 | Kellam et al. | |
| D890,296 S | 7/2020 | Chandler | |
| 11,365,135 B2 | 6/2022 | Fenton et al. | |
| 11,484,386 B2 | 11/2022 | Chandler | |
| 11,826,483 B2 * | 11/2023 | Hammarback | A61L 2/23 |
| 2006/0208397 A1 | 9/2006 | Ichikawa | |
| 2008/0045925 A1* | 2/2008 | Stepovich | A61M 5/16827 604/82 |
| 2009/0008318 A1 | 1/2009 | Anes et al. | |
| 2009/0225808 A1 | 9/2009 | DiLeo | |
| 2010/0297577 A1* | 11/2010 | Cohen | A61M 1/79 210/85 |
| 2011/0089092 A1* | 4/2011 | Williams | B01D 35/147 210/120 |
| 2017/0174528 A1 | 6/2017 | Sun | |
| 2017/0240449 A1 | 8/2017 | Barlow | |
| 2017/0348448 A1 | 12/2017 | Hammarback | |

FOREIGN PATENT DOCUMENTS

| | | |
|---|---|---|
| CN | 2663399 | 12/2004 |
| CN | 102050537 | 5/2011 |
| CN | 202620862 | 12/2012 |
| CN | 103068458 | 4/2013 |
| CN | 103637847 | 3/2014 |
| CN | 205472838 | 8/2016 |
| KR | 20050045492 | 5/2005 |
| WO | 1999/022663 | 5/1999 |

OTHER PUBLICATIONS

International Search Report and Written Opinion of the International Searching Authority dated Jan. 11, 2019 of International PCT Application No. PCT/US2018/056991 filed Oct. 23, 2018.
International Preliminary Report on Patentability issued in PCT/US2019/048465, mailed Mar. 11, 2021.
International Search Report and Written Opinion of the International Searching Authority Dated Nov. 14, 2019, of International PCT Application No. PCT/US2019/48465 filed Aug. 28, 2019.

* cited by examiner

WATER TREATMENT DISPENSING APPARATUS

CROSS-REFERENCE TO RELATED APPLICATIONS

This application is a divisional of U.S. patent application Ser. No. 16/757,480, filed on Apr. 20, 2020, which is a United States National Filing Under 35 U.S.C. § 371 from International Patent Application No. PCT/US18/56991, filed Oct. 23, 2018, which claims the benefit of priority to Provisional Patent Application No. 62/576,169 filed Oct. 24, 2017, the contents of which are herein incorporated in their entirety for all purposes.

BACKGROUND

All modern dental units have a water supply that provides coolant and rinse water to the dynamic dental instruments including the high-speed hand piece, air/water syringe and ultrasonic scaler. This water supply is connected to a domestic water source system. Microbiological studies of this water supply revealed that the water is contaminated by water organisms and oral flora. Microorganisms colonize dental units and contaminate dental treatment water. The formation of biofilm on water-bearing surfaces in dental units results in fouling of the water that passes through the unit with high levels of suspended bacteria. These organisms have been found to be massive in number and some identified as pathogenic. Dental researchers have stated that this contamination could cause infection in immuno-suppressed patients, and cross-infection may occur between dental patients.

Medical and dental uses of water require a supply of water that does not contain organic, inorganic and pathogenic contaminants. Conventional tap water must be treated to remove organic and inorganic materials and destroy pathogenic contaminants, such as bacteria and viruses that are detrimental to humans. Dental instruments used in dental treatment theaters and clinics utilize coolant and rinse water. The water supply can be tap water or bottled water. The water supply can be contaminated with organic and inorganic materials including pathogenic microorganisms.

Biofilms include microbial masses attached to surfaces that are suffused with liquids, such as dental unit tubing. Organisms grow in organized structures with channels in between, similar to a vascular system. The biofilm remains attached as water flows through the dental unit tubing. However, some microbes in the biofilm may be periodically released into the flowing fluid where they can be transported to the outlet of the water line, e.g., the air/water syringe or spray hand piece or a bottle. Examples of microbes found in dental unit water lines include species of waterborne pseudomonas, legionella, klebsiella, moraxella, bacillus, flavobacterium, and escheria as well as organisms common to the oral environment. Thus, biofilms can continually contaminate water flowing through a dental unit line.

Current approaches to improve the quality of dental water include waterline flushing, independent reservoirs filled with distilled water, chemical "shock treatment," continuous chemical treatment, mechanical filtration and automated in-line treatment devices. Waterline flushing may temporarily reduce bacteria levels, however, the biofilm remains active, and at any given time a patient may be exposed to elevated levels of bacteria or viruses.

Therefore, a need exists for a dental water treatment system that has an antimicrobial effect but is not toxic or irritating to humans. The treated water desirably should not have an unpleasant taste or odor. The system should detach biofilm and discourage subsequent reformation, while protecting the dental unit's internal components from corrosion or degradation. If delivered continuously in treatment water, the system desirably should not reduce the effect on enamel or dental bonding agents.

SUMMARY

This application is directed to a cartridge for use in a water purification apparatus and water purification method for maintaining dental unit water quality. A water treatment dispensing apparatus including the cartridge described in this disclosure is also provided.

In some embodiments, a cartridge for treating water is provided. The cartridge comprises an elongated tubular body having a first end, a second end opposite the first end and an internal chamber extending between the first end and the second end. The first end of the elongated tubular body having a fluid inlet and the second end of the elongated tubular body having a fluid outlet. The first end of the elongated tubular body comprising an end cap having a substantially circular opening in fluid communication with the fluid inlet and the internal chamber. A water treatment medium is disposed in the internal chamber of the elongated tubular body. A first filter is provided that is disposed in the elongated tubular body adjacent to the substantially circular opening and adjacent to the water treatment medium, and a second filter is disposed in the elongated tubular body adjacent the second end and in fluid communication with the internal chamber and the fluid outlet. In other embodiments, the end cap further comprises an interior surface, the interior surface having swaging at discrete positions of the interior surface.

In other aspects, a cartridge is provided for disinfecting water. The cartridge comprises an elongated tubular body having a first end comprising a fluid inlet, a second end opposite the first end, the second end comprising a fluid outlet, and an internal chamber extending between the first and end and the second end and in fluid communication with the fluid inlet and the fluid outlet. The first end of the elongated tubular body comprises an end cap having a first opening in fluid communication with the elongated tubular body. A disinfectant material is provided that is disposed in the internal chamber of the body for disinfecting water. A first filter is disposed in the elongated tubular body adjacent to the first opening and adjacent to the disinfectant material, and a second filter is disposed in the elongated tubular body adjacent the second end of the elongated tubular body and in fluid communication with the internal chamber and the fluid outlet. The second end of the elongated tubular body comprises an exterior surface, the exterior surface having a tapered portion and a linear portion adjacent to the tapered portion. In various aspects, the second opening allows the disinfected water to flow out of the cartridge for use with a dental unit water line, for example.

In yet another embodiment, a cartridge for disinfecting water is provided, the cartridge comprising an elongated tubular body having a first end comprising a fluid inlet, a second end opposite the first end, the second end comprising a fluid outlet, and an internal chamber disposed between the first end and the second end. The first end of the elongated tubular body comprises an end cap having a substantially circular opening in fluid communication with the fluid inlet and the internal chamber. A disinfectant material is provided that is disposed in the internal chamber of the body for disinfecting water. A first filter is disposed in the elongated tubular body adjacent to the substantially circular opening and adjacent to the disinfectant material, and a second filter is disposed in the elongated tubular body adjacent the second end and in fluid communication with the internal chamber and the fluid outlet. The second end comprises an exterior surface. The exterior surface has a tapered portion and a linear portion adjacent to the tapered portion. In various embodiments, the exterior surface of the second end comprises a second opening for allowing the disinfected water to flow out of the cartridge for use, for example, with a dental unit water line.

In other aspects, a water treatment dispensing apparatus for neutralizing and destroying pathogenic contaminants, water borne bacteria and viruses is provided. The apparatus comprises a container having a compartment within for holding water and a neck having a passage open to the chamber. The container is releasably mounted on a cap or another type of housing to allow the container to be removed for cleaning or replacement of a cartridge located inside the container. A cap is releasably mounted on the neck of the container, the cap having first, second and third passages open to the passage in the neck. A water supply unit can direct water to the first passage in the cap to supply water to the compartment of the container. The water source can be tap water or bottled water including distilled or deionized water. An air pressure supply device operates to direct pressurized air to the second passage in the cap into the compartment of the container to subject the water in the compartment of the container to air pressure. A cartridge containing a bed of disinfectant material located in the internal compartment of the container has an end member connected to the cap directly or through an elongated straw to allow disinfected water to flow out of the cartridge through the cap or another type of housing to a desired location, for example, a dental unit purified water line. The air pressure in the interior compartment forces the water in the internal compartment of the container to flow through the cartridge to a dental instrument.

Filters associated with the first and second ends of the cartridge retain the bed of disinfectant material in the tubular body of the cartridge to remove organic, inorganic and microbiological contaminants from the water flowing into and out of the cartridge. An air pressure gauge mounted on the cap is operable to monitor the pressure of the air in the compartment of the container. In particular, a cartridge useful for the water treatment dispensing apparatus comprises an elongated tubular body having a first end comprising a fluid inlet, a second end opposite the first end, the second end comprising a fluid outlet, and an internal chamber disposed between the first end and the second end. The first end of the elongated tubular body comprises an end cap having a substantially circular opening in fluid communication with the fluid inlet and the internal chamber. A disinfectant material is provided disposed in the internal chamber of the body for disinfecting water. A first filter is disposed in the elongated tubular body adjacent to the substantially circular opening and adjacent to the disinfectant material, and a second filter is disposed in the elongated tubular body adjacent the second end and in fluid communication with the internal chamber and the fluid outlet. The second end comprises an exterior surface, the exterior surface having a tapered portion and a linear portion adjacent to the tapered portion. In various aspects, the second end of the elongated tubular body comprises a second opening configured to allow disinfected water out of the linear portion of the exterior surface. The water treatment dispensing apparatus also includes a tubular member connecting the second end of the elongated tubular body of the cartridge to the cap of the container for carrying disinfected or treated water from the second end to the third passage in the cap and a conduit connected to the cap in communication with the third passage in the cap for carrying water from the cap to a selected location in the dental unit.

In other embodiments, methods of disinfecting water for a dental unit using the cartridge described in this application are provided. The method comprises connecting a cartridge operable to disinfect a source of water to a treated dental unit water line and supplying the disinfected dental water from the second opening of the exterior surface to at least one dental unit treated water line. The cartridge operable to disinfect the source of water includes an elongated tubular body having a first end, a second end opposite the first end and an internal chamber disposed between the first end and the second end. The first end of the elongated tubular body has a fluid inlet and the second end of the elongated tubular body has a fluid outlet. The first end of the elongated tubular body comprises an end cap having a substantially circular opening in fluid communication with the fluid inlet and the internal chamber. A disinfectant material is disposed in the internal chamber of the body. A first filter is disposed in the elongated tubular body adjacent to the substantially circular opening and adjacent to the disinfectant material, and a second filter is disposed in the elongated tubular body adjacent the second end and in fluid communication with the internal chamber and the fluid outlet. The second end comprises an exterior surface, the exterior surface having a tapered portion, a linear portion adjacent to the tapered portion and a second opening configured to allow disinfected water out of the linear portion of the exterior surface to at least one water line.

In some embodiments, there is a kit for treating water, the kit comprising a cartridge comprising an elongated tubular body having a first end, a second end opposite the first end and an internal chamber extending between the first end and the second end. The first end of the elongated tubular body having a fluid inlet and the second end of the elongated tubular body having a fluid outlet. The first end of the elongated tubular body comprises an end cap having a substantially circular opening in fluid communication with the fluid inlet and the internal chamber. A water treatment medium is disposed in the internal chamber of the elongated tubular body. A first filter is disposed in the elongated tubular body adjacent to the substantially circular opening and adjacent to the water treatment medium, and a second filter is disposed in the elongated tubular body adjacent the second end and in fluid communication with the internal chamber and the fluid outlet. The kit further comprises a tubular member configured for connection to a water bottle or a dental unit.

Additional features and advantages of various embodiments will be set forth in part in the description that follows, and in part will be apparent from the description, or may be learned by practice of various embodiments. The objectives and other advantages of various embodiments will be realized and attained by means of the elements and combinations particularly pointed out in the description and appended claims.

BRIEF DESCRIPTION OF THE FIGURES

In part, other aspects, features, benefits and advantages of the embodiments will be apparent with regard to the following description, appended claims and accompanying drawings where:

It is to be understood that the figures are not drawn to scale. Further, the relation between objects in a figure may not be to scale, and may in fact have a reverse relationship as to size. The figures are intended to bring understanding and clarity to the structure of each object shown, and thus, some features may be exaggerated in order to illustrate a specific feature of a structure.

DETAILED DESCRIPTION

For the purposes of this specification and appended claims, unless otherwise indicated, all numbers expressing quantities of ingredients, percentages or proportions of materials, reaction conditions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present application. At the very least, and not as an attempt to limit the application of the doctrine of equivalents to the scope of the claims, each numerical parameter should at least be construed in light of the number of reported significant digits and by applying ordinary rounding techniques.

Notwithstanding the numerical ranges and parameters set forth herein, the broad scope of the application are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a range of "1 to 10" includes any and all subranges between (and including) the minimum value of 1 and the maximum value of 10, that is, any and all subranges having a minimum value of equal to or greater than 1 and a maximum value of equal to or less than 10, e.g., 5.5 to 10.

Reference will now be made in detail to certain embodiments of this application, examples of which are illustrated in the accompanying drawings. While the application will be described in conjunction with the illustrated embodiments, it will be understood that they are not intended to limit the application to those embodiments. On the contrary, the application is intended to cover all alternatives, modifications, and equivalents that may be included within the application as defined by the appended claims.

It is noted that, as used in this specification and the appended claims, the singular forms "a," "an" and "the" include plural referents unless expressly and unequivocally limited to one referent. Thus, for example, reference to "a filter" includes one, two, three or more filters.

We refer now to the drawings wherein depicted elements are not necessarily shown to scale and wherein like or similar elements are designated by the same reference numeral through the several views.

Referring to the drawings in general, it will be understood that the illustrations are to describing particular embodiments of the disclosure and are not intended to be limiting thereto.

While most of the terms used herein will be recognizable to those of ordinary skill in the art, it should be understood that when not explicitly defined, terms should be interpreted as adopting a meaning presently accepted by those of ordinary skill in the art.

Cartridge for Disinfecting Water

Figure 1:
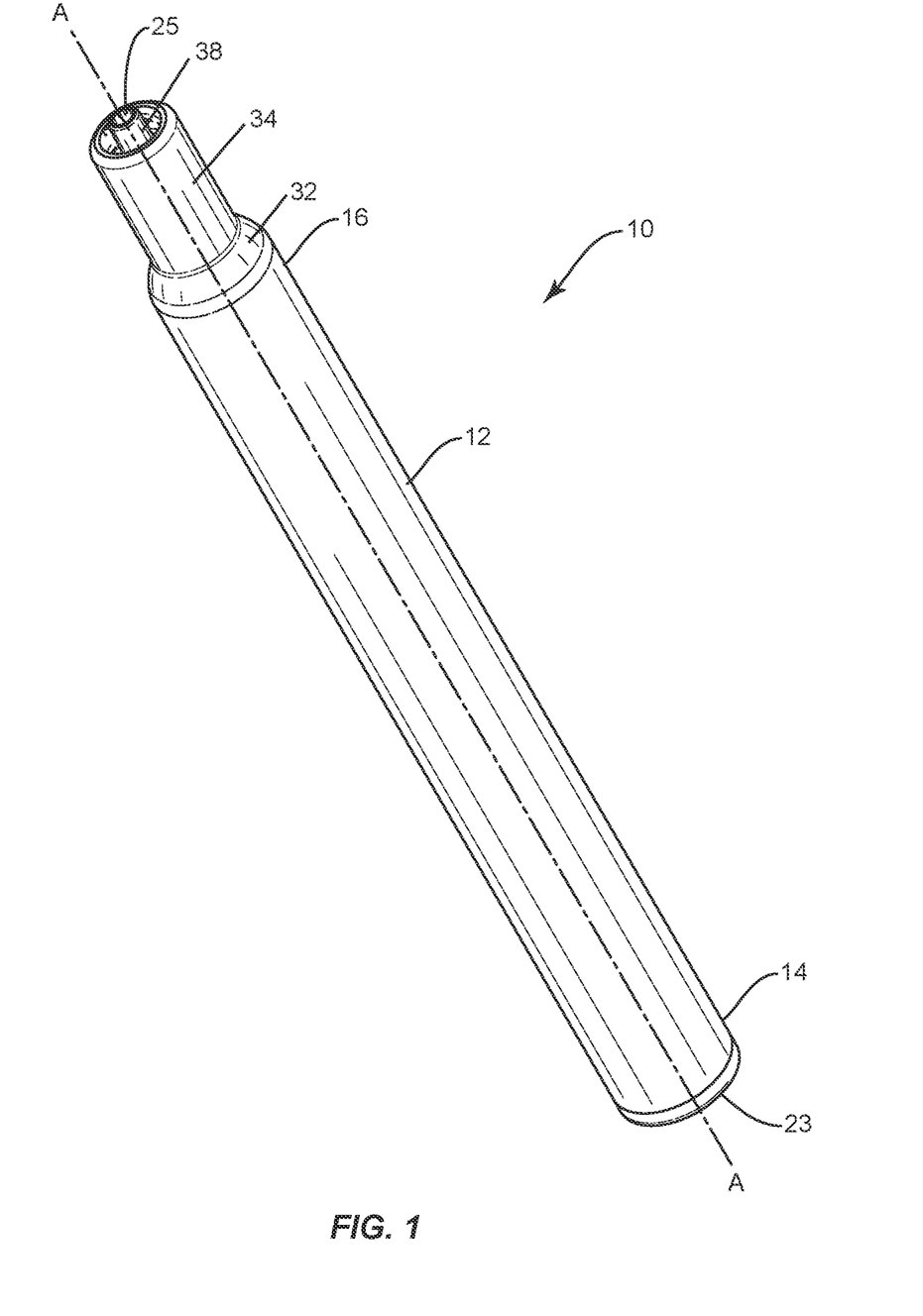
FIG. 1 is a perspective view of a water disinfectant cartridge.
Figure 2:
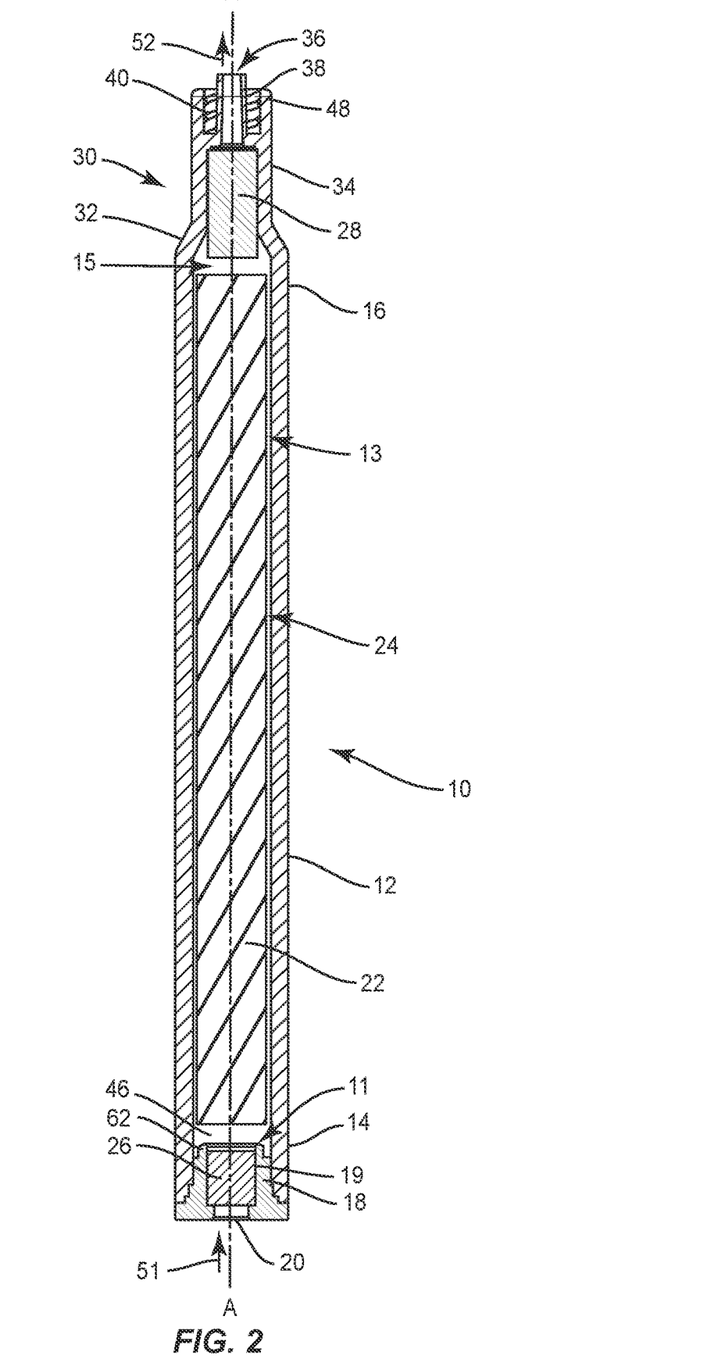
FIG. 2 is a cross-sectional view taken along line AA of FIG. 1.

In certain embodiments, the present disclosure provides a cartridge 10 for treating water as illustrated in FIGS. 1 and 2. The treated water can be used in many applications requiring water without microorganism or contaminants, such as biofilms, for example, in dental applications. The cartridge 10 comprises an elongated tubular body 12 having a first end 14 comprising a fluid inlet 23, a second end 16 opposite the first end 14 comprising a fluid outlet 25, and an internal chamber 24 (shown in the cross-section) extending between the first and second ends of elongated tubular body 12 and in fluid communication with the fluid inlet 23 and the fluid outlet 25. Body 12 is a tubular one-piece member of polymeric material, such as rigid polyethylene or like materials that are resistant to build up of organic matter inside the tubular member. In some embodiments, the body and/or tubular member can be made of polyurethane, polyurea, polyether(amide), PEBA, thermoplastic elastomeric olefin, copolyester, and styrenic thermoplastic elastomer, steel, aluminum, stainless steel, titanium, metal alloys with high non-ferrous metal content and a low relative proportion of iron, carbon fiber, glass fiber, plastics, ceramics or a combination thereof.

Figure 2A:
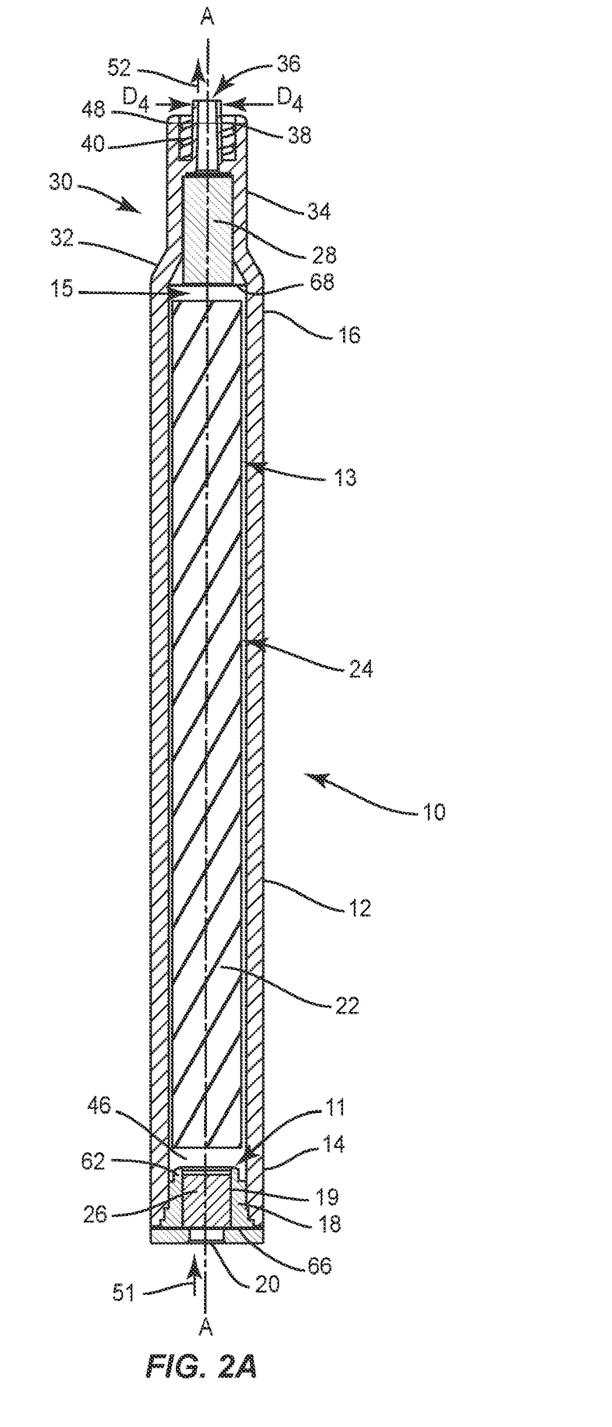
FIG. 2A is a cross-sectional view of another embodiment of the water disinfectant cartridge having a first wire screen and a second wire screen.

In some embodiments, polypropylene and polyvinyl chloride can be used as materials for elongated tubular body 12. The elongated tubular body 12 also has a cylindrical side wall 13 surrounding and defining the internal chamber 24. The first end 14 of the elongated tubular body 12 includes an end cap 18 having a substantially circular opening 20 in fluid communication with the fluid inlet 23 and the internal chamber 24. A water treatment medium 22 is disposed in the internal chamber 24 of the elongated tubular body 12 for treating water 46 in the internal chamber 24 of the body 12; a first filter 26 is disposed in the elongated tubular body 12 adjacent to the substantially circular opening 20 and adjacent to the water treatment medium 22; a second filter 28 is disposed in the elongated tubular body 12 adjacent to the second end 16 and in fluid communication with the internal chamber 24 and the fluid outlet to allow flow of treated water out of the elongated tubular body 12. The diameter of the first end 14 is larger than the diameter of the linear portion 34, which will allow aiding in the water treatment. In some applications, there is a first gap 11 located between first filter 26 and water treatment material 22. A second gap 15 is disposed between water treatment material 22 and second filter 28. In other applications, water treatment material 22 is flush with both, first filter 26 and second filter 28. As shown in FIGS. 2 and 2A, the first filter and the second filter are disposed within or adjacent to the internal chamber, however, in some embodiments, the first filter and the second filter can be adjacent to the first end and the second end. In some embodiments, the first filter and the second filter can be a screen and/or can be monolithic with the body.

Figure 7:
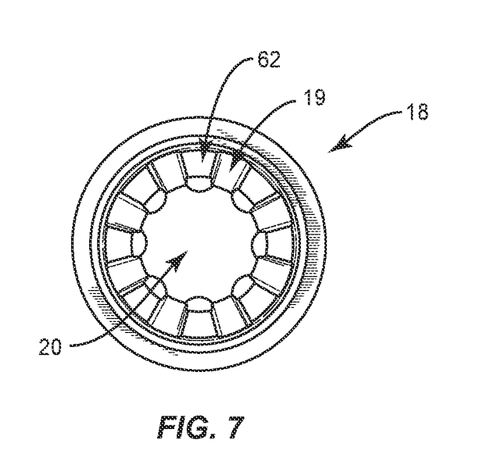
FIG. 7 is a top plan view of the end cap having swaging.

In some embodiments, the end cap 18 further comprises an interior surface 19. The interior surface 19 has swaging at discrete positions 62 of the interior surface as illustrated in FIGS. 2, 2A and 7. In some aspects, the first opening 20 in the elongated tubular body 12 can have a shape other than substantially circular, for example, without limitation triangular, square, rhombic, irregular polygon as long as the middle portion of the opening is not obstructed. In other aspects, the first opening 20 is circular having a diameter from about 4 mm to about 6 mm. Arrow 51 shows the direction of water flow into cartridge 10. Arrow 52 illustrates the direction of treated water flow out of cartridge 10.

Figure 6:
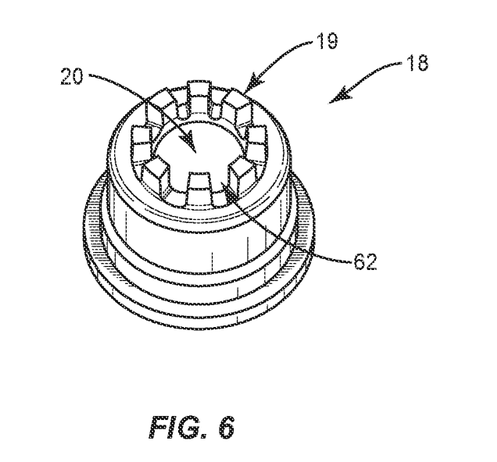
FIG. 6 is a perspective view of the end cap having swaging.
Figure 8:
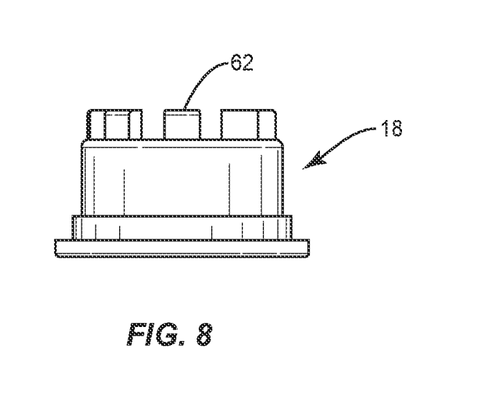
FIG. 8 is a side view of the end cap.

The end cap 18 further comprises, consists essentially of or consists of an interior surface 19, the interior surface having swaging 62 at discrete positions of the interior surface 19 as illustrated in FIGS. 6, 7 and 8. The interior surface 19 of the end cap 18 is swaged over the edges of the first filter 26 to hold the first filter 26 in position. In some embodiments, the material of the end cap 18 is displaced over the edge of the first filter 26. As a result of the swaging, the first filter 26 is configured to withstand a minimal axial push out force of 2 lbs without dislodging the first filter from the end cap. The interior surface 19 of end cap 18 can be tubular in some cases and include a height of from about 5 mm, 6, 7, 8, 9 mm to about 10 mm surrounding the first filter 26. In various applications, the end cap 18 is sonic molded at the first end 14 to the elongated tubular body 12. The resulting weld joint is strong and can withstand a minimum axial force of about 40 lbs without failing.

First filter 26 is located in the interior surface 19 of end cap 18 and can be used to remove organic, inorganic and foreign materials from the water in the internal chamber 24 of body 12.

The first filter 26 can be, in some cases, a cylindrical polypropylene member having small porosity such as 5 microns. Other types of filters can be used to remove particulates from the water flowing through opening 20 of first end 14 into chamber 24. First filter 26 can be removed from interior surface 19 of end cap 18 and replaced with another filter. First filter 26 can extend into internal chamber 24. First filter 26 can include activated charcoal that functions to remove chlorine and chlorine compounds from the water flowing out of the filter into internal chamber 24. First filter 26 can be made from different materials including without limitations polyester, polyurethane, bonded foam or a sponge material, for example, foamed plastic polymers, low density polyether or PVA.

Figure 13:
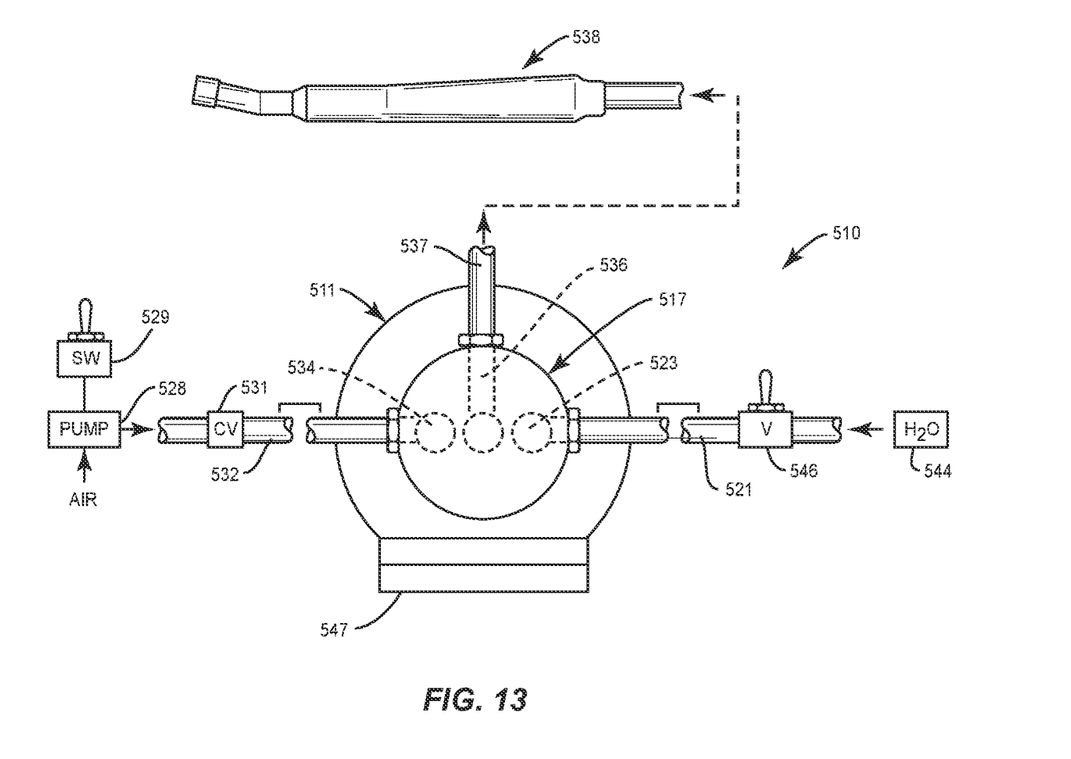
FIG. 13 is a diagram of the top plan view of FIG. 11 employed with a dynamic dental instrument or dental unit.

As shown in FIG. 2, internal chamber 24 contains a bed of water treatment medium 22, in some cases, a disinfectant material that has germicidal functions to neutralize and destroy water contaminants including bacteria, viruses and other pathogens. The disinfectant material 22 also supplies a residual disinfectant in the water flowing out of cartridge 10. The residual disinfectant eluted from the disinfectant material 22 neutralizes water contaminants in internal chamber 24, hose 537 and hand piece 538 as illustrated in FIG. 13. The materials of hose 537 absorb disinfectant until the inside of its walls become passivated or saturated with disinfectant to prevent microbial adhesion and biofilm slime in hose 537. The water spray dispensed from hand piece 538 includes the disinfectant which destroys oral flora and reduces the potential cross-infection between dental patients and prevents disease transmission to the patients.

An example of water treatment medium or disinfectant material 22 can be (i) iodine; (ii) an iodinated anionic exchange resin; (iii) a resin matrix iodinated with elemental iodine; (iv) a resin containing polyiodide; or (v) silver as further described below. A continuous release of iodine into the water can neutralize disease causing bacteria, viruses and other pathogens. Iodine is an effective disinfectant for water borne pathogenic bacteria and viruses. An alternative disinfectant material can be an iodinated anionic exchange resin manufactured and sold by MCV Technologies International, Inc. of Belleville, Ill. This resin releases a specific and consistent amount of iodine into the water flowing in internal chamber 24 to neutralize the microbial contaminates in the water. The disinfectant material 22 can be a resin matrix iodinated with elemental iodine, to a level of 2 to 6 ppm of iodine in water flowing through the resin. The resin contains approximately 46 percent by weight active iodine and 54 percent by weight of inactive ingredients. The effluent iodine removes biofilm from hose 537 and hand piece 538 and performs a germicidal function thereon. The disinfectant material 22 can be silver or a silver composition that contains silver and a metal or a silver impregnated activated carbon that maintains sufficient amounts of silver ions in the water to effectively disinfect the water. Examples of silver self-regulating water purifications are disclosed in U.S. Pat. Nos. 5,223,149 and 6,254,894.

Figure 11:
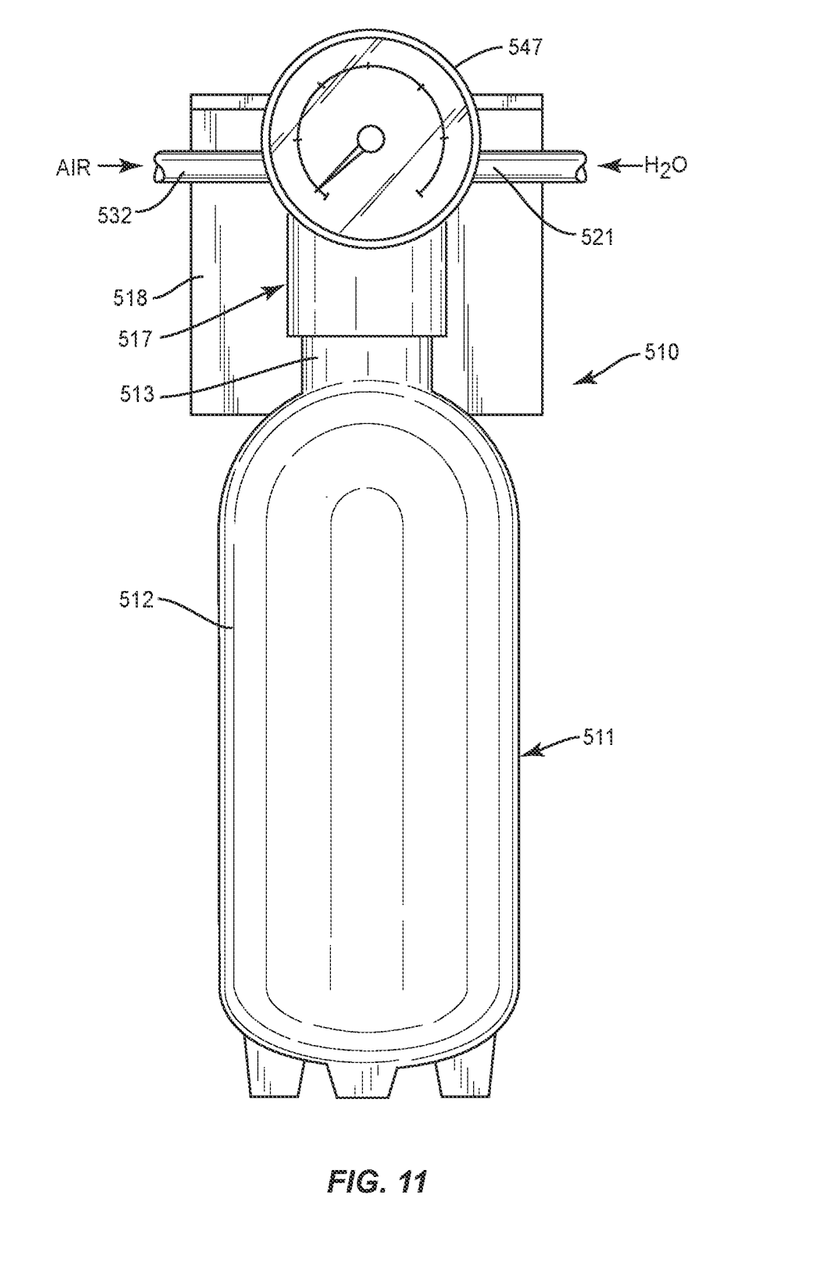
FIG. 11 is front elevational view of a water treatment dispensing apparatus having a water disinfectant cartridge.
Figure 12:
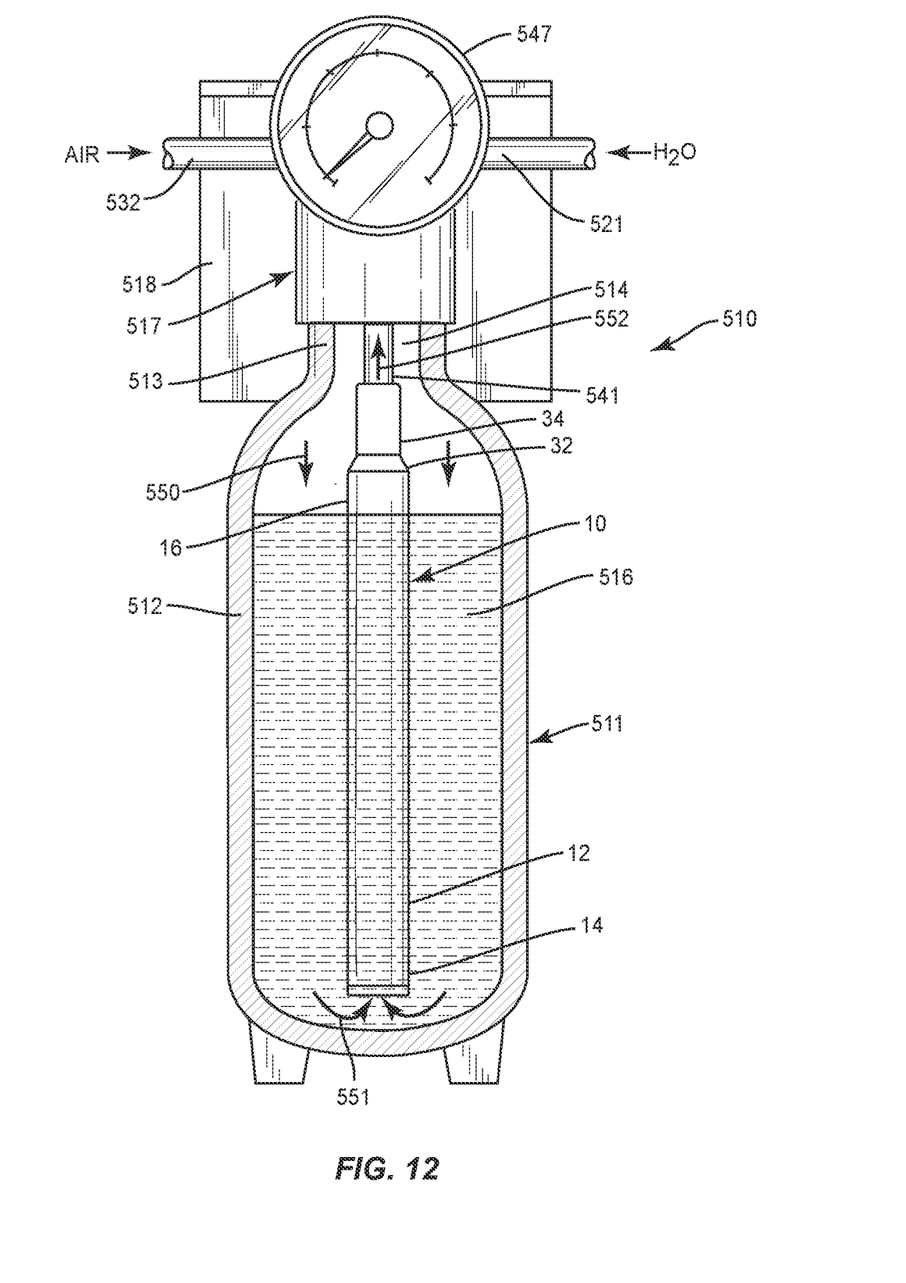
FIG. 12 is a front elevational view partly cross-sectioned bottle of the water treatment dispensing apparatus showing the water disinfectant cartridge.

In certain aspects, a first wire screen 66 can be interdisposed between the first filter 26 and the circular opening 20. FIG. 2A illustrates an embodiment of cartridge 10 having a first wire screen 66 and a second wire screen 68. Second end 16 can comprise a second wire screen 68 disposed adjacent to the second filter 28 as illustrated in FIG. 2A. In some cases, second wire screen 68 is disposed between second filter 28 and disinfectant material 22. In various embodiments, cartridge 10 can be placed in a container 511, for example a bottle, as illustrated in FIGS. 11 and 12.

In certain embodiments, the present disclosure provides a cartridge 10 for disinfecting water 46. Cartridge 10 comprises, consists essentially of or consists of an elongated tubular body 12 having a first end 14 comprising a fluid inlet 23, a second end 16 opposite first end 14 comprising a fluid outlet 25, and an internal chamber 24 extending between the first end and the second end of elongated tubular body 12, the internal chamber 24 being in fluid communication with the fluid inlet 23 and the fluid outlet 25. As discussed before, first end 14 of elongated tubular body 12 comprises an end cap 18, which has a first opening 20 in fluid communication with the fluid inlet 23 and the internal chamber 24 to allow flow of water into the elongated tubular body. First opening 20 is, in some cases, substantially circular or circular. A water treatment medium or disinfectant material 22 is disposed in internal chamber 24 of elongated tubular body 12 for disinfecting water 46 in the internal chamber of the body. First filter 26 is disposed in the elongated tubular body 12 adjacent to the first opening 20 and adjacent to the disinfectant material 22. Second filter 28 is disposed in the elongated tubular body 12 adjacent second end 16 and in fluid communication with internal chamber 24 and the fluid outlet 25 to allow flow of water 46 out of the elongated tubular body. Second end 16 comprises an exterior surface 30, the exterior surface having a tapered portion 32 and a linear portion 34 adjacent to the tapered portion 32. In some embodiments, the tapered portion 32 reduces the amount of material needed for the body and also is easier to mold.

Figure 3:
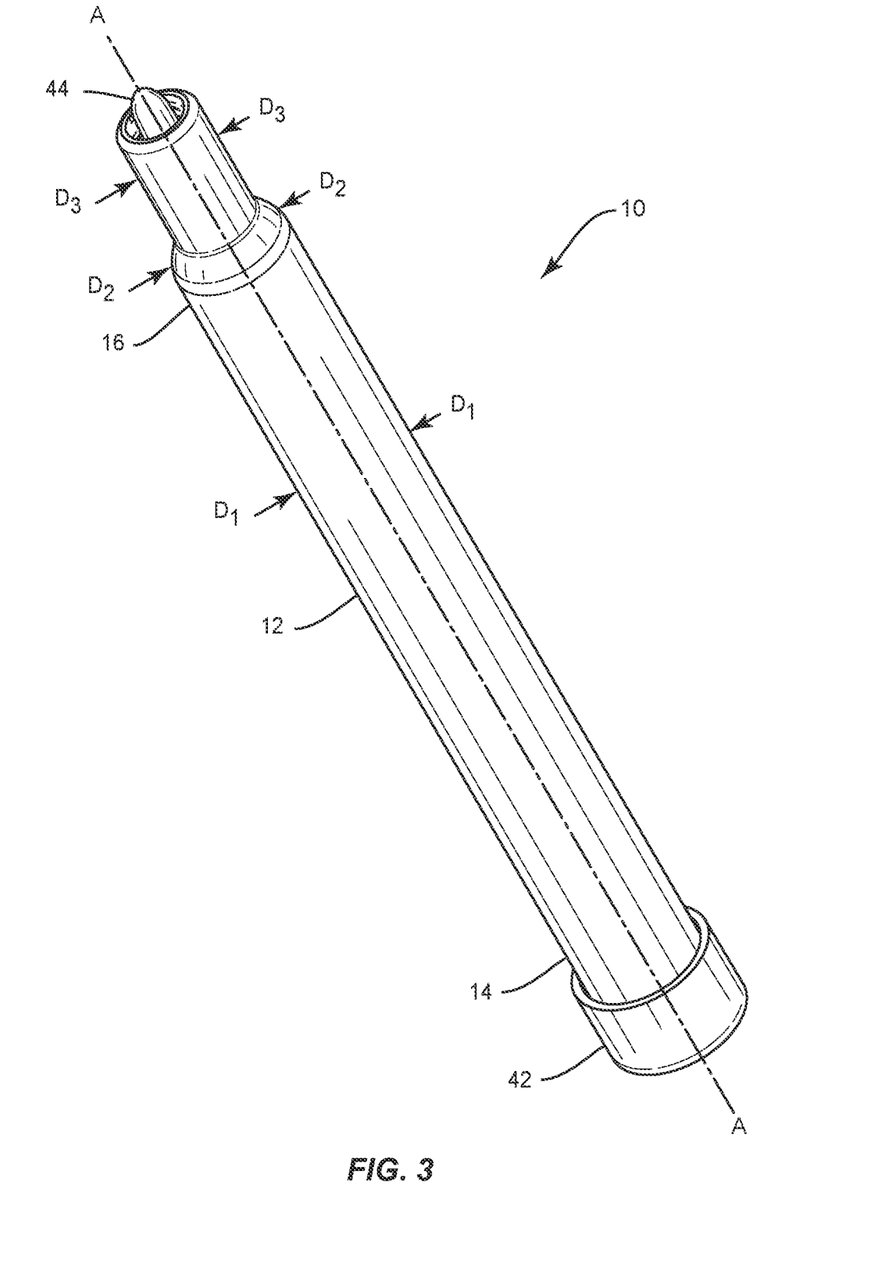
FIG. 3 is a perspective view of a water disinfectant cartridge having dust caps.
Figure 9:
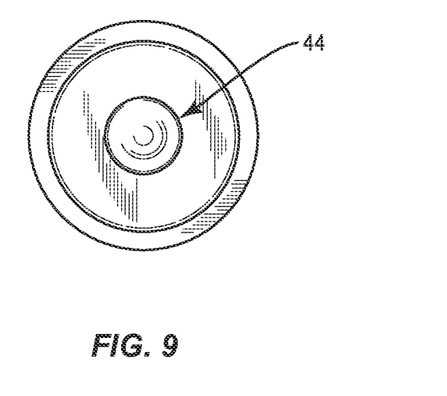
FIG. 9 is top plan view of the water disinfectant cartridge having dust caps of FIG. 3.
Figure 10:
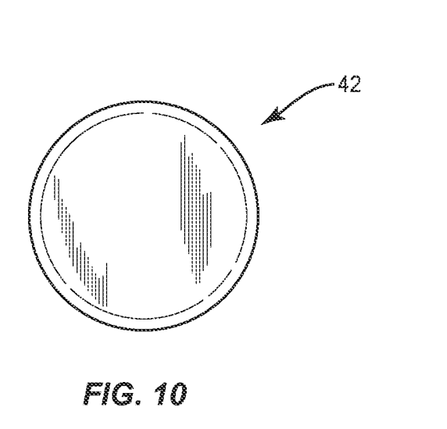
FIG. 10 is a bottom plan view of the water disinfectant cartridge having dust caps of FIG. 3.

Exterior surface 30 includes a second opening 36 configured to engage with a dental water line. Second opening 36 can have a diameter from about 1 mm to about 2 mm illustrated as $D_4$ in FIG. 2A. In some applications, exterior surface 30 can be a luer fitting, in some cases, a male luer fitting. In various applications, the cartridges described in this application also include a first dust cap 42 and a second dust cap 44 as illustrated in FIGS. 3, 9 and 10. Dust cap 42 covers first end 14 and dust cap 44 covers nipple 38 as illustrated in FIGS. 9 and 10.

Figure 4:
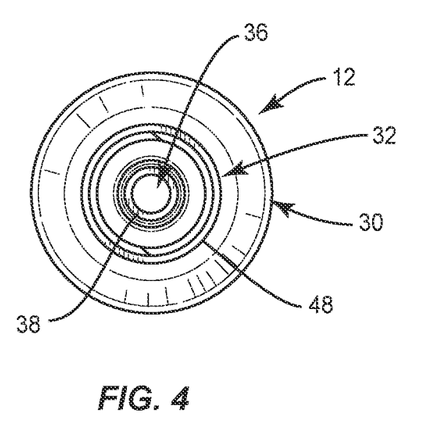
FIG. 4 is a top plan view of the water disinfectant cartridge of FIG. 1.
Figure 5:
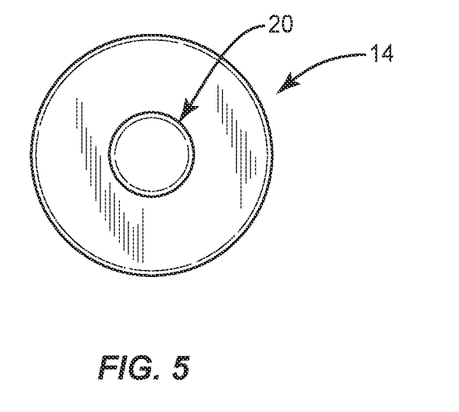
FIG. 5 is a bottom plan view of the water disinfectant cartridge of FIG. 1.

In various embodiments, as illustrated in FIGS. 4 and 5, exterior surface 30 comprises an annular wall 48 and a nipple 38. Annular wall 48 can surround nipple 38, wherein the nipple is disposed adjacent second filter 28 at the end of linear portion 34 of the annular wall. In many applications, annular wall 48 is spaced from the nipple to allow a tubular member or a dental water line 514 (FIG. 12) to be mounted to nipple 38. In some aspects, the interior length of the annular wall can vary from about 5 mm to about 9 mm, in particular from about 5 mm, 6, 7, 8 to about 9 mm. In certain aspects, annular wall 48 includes threads 40, the threads 40 being configured for cooperating with a dental unit water line 541 (FIG. 12).

In certain embodiments, the diameter $D_1$ of elongated tubular body 12 of cartridge 10 varies from about 11 mm to about 17 mm, in particular, from about 11 mm, 12, 13, 14, 15, 16 to about 17 mm as illustrated in FIG. 3. The length of elongated tubular body 12 can also vary from about 120 mm to about 135 mm, in particular from about 120 mm, 121, 122, 123, 124, 125, 126, 127, 128, 129, 130, 131, 132, 133, 134, 135, to about 137 mm, which length may include first end 14. In other embodiments, the total length of cartridge 10 including the tip of nipple 38 but excluding any dust caps varies from about 150 mm to 160 mm, in particular from about 150 mm, 151, 152, 153, 154, 155, 156, 157, 158, 159 to about 160 mm.

Exterior surface 30 has a tapered portion 32 and a linear portion 34. The tapered portion is reduced gradually from elongated tubular body 12 to linear portion 34 at an angle sloping to about 45 degrees to the horizontal of tubular body 12. Linear portion 34 of exterior surface 30 has a diameter $D_3$ varying from about 5 mm to about 10 mm, in particular from about 5 mm, 6, 7, 8, 9 mm to about 10 mm. Diameter $D_2$ of tapered portion 32 will decrease from $D_1$ to $D_3$ as illustrated in FIG. 3. The length of linear portion 34 can vary from about 10 mm to about 21 mm, in particular from about 10 mm, 11 mm, 12 mm, 13 mm, 14 mm, 15 mm, 16 mm, 17 mm, 18 mm, 19 mm, 20 mm to about 21 mm. Nipple 38 can exceed the length of annular wall 48 by about 1 mm or 2 mm.

In various embodiments, cartridge 10 having an exterior surface which has a tapered portion and a linear portion adjacent to the tapered portion can be placed in a container that includes water for disinfection, for example, a bottle. As before, the disinfectant material can include (i) iodine; (ii) an iodinated anionic exchange resin; (iii) a resin matrix iodinated with elemental iodine; (iv) a resin containing polyiodide: or (v) silver.

The present disclosure also provides a cartridge 10 for disinfecting water 46. Cartridge 10 comprises an elongated tubular body 12 having a first end 14 comprising a fluid inlet 23, a second end 16 opposite the first end comprising a fluid outlet 25, and an internal chamber 24 disposed between the first end and the second end of tubular body 12 in fluid communication with the fluid inlet 23 and the fluid outlet 25. The first end of the elongated tubular body comprising an end cap 18, which has a substantially circular opening 20 in fluid communication with the fluid inlet 23 and the internal chamber 24 to receive water and allow flow into elongated tubular body 12. A disinfectant material 22 is disposed in the internal chamber of the body for disinfecting water in the internal chamber of the body. First filter 26 is disposed in elongated tubular body 12 adjacent to substantially circular opening 20 and adjacent to the disinfectant material 22. A second filter 28 is disposed in elongated tubular body 12 adjacent the second end and in fluid communication with the internal chamber 24 and the fluid outlet 25 to receive water 46 flowing from the first end of the elongated tubular body. Second end 16 of elongated tubular body 12 comprises an exterior surface 30, the exterior surface having a tapered portion 32 and a linear portion 34 adjacent to tapered portion 32. Exterior surface 30 includes a second opening 36 configured for releasing treated or disinfected water out of the linear portion of the exterior surface to at least one water line, for example, a dental unit water line. Arrow 51 in FIGS. 2 and 2A shows the inflow of untreated water from first end 14 to second end 16 of cartridge 10. Arrow 52 shows the outflow of treated water from second opening 36 of exterior surface 30. In various aspects, linear portion 34 of exterior surface 30 can be a luer type fitting for cooperating with a dental water line.

In yet another embodiment, the present disclosure provides a method of disinfecting water, the method comprising: supplying water to a cartridge comprising an elongated tubular body 12 as illustrated in FIGS. 2 and 2A, the tubular body having a first end, a second end opposite the first end, and an internal chamber 24 disposed between the first end and the second end. The first end of the elongated tubular body 12 has a fluid inlet 23 and the second end of the elongated tubular body has a fluid outlet 25. The first end 14 of elongated tubular body 12 comprises an end cap 18 having a substantially circular opening 20 in fluid communication with the elongated tubular body 12 to receive water 46 and allow flow into the elongated tubular body. A disinfectant material is disposed in internal chamber 24 of body 12 for disinfecting water in the internal chamber of the body; a first filter 26 is disposed in elongated tubular body 12 adjacent to the substantially circular opening 20 and adjacent to disinfectant material 22; and a second filter 28 is disposed in the elongated tubular body 12 adjacent to second end 16 and in fluid communication with the internal chamber and the fluid outlet 25 to receive water flowing from the first end of the elongated tubular body. Second end 16 comprises an exterior surface 30, the exterior surface having a tapered portion 32, a linear portion 34, the linear portion adjacent to the tapered portion and a second opening 36 configured to allow the disinfected water out of the linear portion of the exterior surface to at least one water line. The treated or disinfected water can be supplied to a dental unit. In some instances, cartridge 10 is placed in a container containing water that needs to be treated for use in a dental unit.

Water Treatment Dispensing Apparatus

In various aspects, a water treatment dispensing apparatus 510 is provided as illustrated in FIGS. 11, 12 and 13. The water treatment dispensing apparatus comprises a container 511 which has an internal compartment 516 for holding water 520 and a neck 513. The neck has a passage 514 open to compartment 516. A cap 517 is releasably mounted on neck 513 of container 511. The cap has three passages, a first 523, a second 534 and a third passage 536, all open to passage 514 in neck 513. A water supply unit 544 for directing water 520 to first passage 523 in cap 517 to supply water to compartment 516 of container 511. An air pressure supply device, for example, an air pump 528 can be used for directing pressurized air to the second passage 534 in cap 517 and compartment 516 of container 511 to subject the water in compartment 516 of container 511 to air pressure.

Cartridge 10 for treatment or disinfection of water as described above and shown in FIGS. 2 and 2A can be placed inside container 511, which, in some cases, can be a bottle. Cartridge 10 comprises an elongated tubular body 12 which has a first end 14 comprising a fluid inlet 23, a second end 16 opposite the first end comprising a fluid outlet 25, and an internal chamber 24 disposed between the first end and the second end. The first end of the elongated tubular body comprises an end cap 18 having a substantially circular opening 20 in fluid communication with the fluid inlet 23 and the internal chamber to receive water 520 and allow water flow into the elongated tubular body. A disinfectant material 22 is disposed in internal chamber 24 of body 12 for disinfecting water 520 in the internal chamber of the body. A first filter 26 is disposed in elongated tubular body 12 adjacent to the substantially circular opening 20 and adjacent to disinfectant material 22. A second filter 28 is disposed in elongated tubular body 12 adjacent to second end 16 and in fluid communication with the internal chamber and the fluid outlet 25 to receive water flowing from first end 14 of elongated tubular body 12. Second end 16 comprises an exterior surface 30 which has a tapered portion 32, a liner portion 34 adjacent to the tapered portion and a second opening 36 configured to allow disinfected water out of the linear portion of the exterior surface. A tubular member 541 connects second end 16 of elongated tubular body 12 to cap 517 for carrying disinfected water from second end 16 to third passage 536 in cap 517. A conduit connected to cap 517 in communication with third passage 536 in the cap is used for carrying water from the cap to a selected location in the dental unit.

With further reference to FIGS. 11, 12 and 13, a water treatment dispensing apparatus 510 is illustrated. Apparatus 510 has a container or bottle 511 joined to a housing or cap 517. Container 511 has a cylindrical side wall 512 and a neck 513 surrounding an internal compartment 516. Neck 513 includes a passage 514 open to compartment 516 and the bottom of cap 517. Neck 513 and cap 517 can cooperate releasably with connectors to a dental unit (not shown). In some aspects, a bracket 518 can be used to support cap 517. Other structures can be used to hold cap 517 and container 511 in a fixed position. Cap 517 can be connected through a tube 521 to a source for supplying water 520 into compartment 516. As shown in FIG. 13, a water supply unit 544 directs water into tube 521. A valve 546 incorporated in tube 521 can be manually operated to regulate the flow of water into chamber 516. Water supply unit 544 can be ordinary tap water from a municipal water system. In some applications, distilled or deionized water in a bottle can be dispensed into compartment 516.

Compressed air is supplied to cap 517 from an air supply unit having an air pump 528 driven with an electric motor controlled with a manually operated controller 529. Air is directed to a check valve 531 located in a tube 532 to direct air to a passage 534 which opens neck passage 514. As shown in FIG. 12, air in compartment 516 applies pressure, shown by arrows 550 on water 520 to force the water to flow into a water purification cartridge 10 as shown by arrow 551. Cartridge 10 is connected to a tube 541 joined to cap 517. Compartment 516 has a passage 536 open to tube 541 and a flexible conduit or hose 537 operable to transport purified water shown by arrow 552 from container 511 to a dental hand instrument 538. Dental instrument 538 shown as a dental hand piece can include an air/water syringe, ultrasonic scaler or other dynamic dental instruments. In some cases, the air pressure in compartment 516 can be monitored with an air pressure gauge 547 mounted on cap 517.

In some embodiments, a kit is provided including the cartridge comprising an elongated tubular body having a first end, a second end opposite the first end and an internal chamber extending between the first end and the second end, the first end of the elongated tubular body having a fluid inlet 23 and the second end of the elongated tubular body having a fluid outlet 25, the first end of the elongated tubular body comprising an end cap having a substantially circular opening in fluid communication with the fluid inlet 23 and the internal chamber to allow flow of water into the elongated tubular body; a water treatment medium disposed in the internal chamber of the body for treating water in the internal chamber of the body; a first filter disposed in the elongated tubular body adjacent to the substantially circular opening and adjacent to the water treatment medium; and a second filter disposed in the elongated tubular body adjacent the second end and in fluid communication with the internal chamber and the fluid outlet 25 to allow flow of water out of the elongated tubular body; and a tubular member shown as a tube 541 configured for connection to a water bottle or a dental unit. The tubular member can engage a water bottle, a pressure source, a water source or a combination thereof. The tube can have a diameter smaller than the diameter of the first end 14 shown in FIG. 1. The tubular member can engage the leur fitting shown 39 in FIG. 1. In some embodiments, the tubular member can be a straw that can engage with leur fitting 39. The kit may include additional parts along with an instruction booklet, which may include a chart that shows how to connect the cartridge to a bottle or water supply. A cover of the kit may include illustrations on attaching the cartridge to a water supply, bottle or a tube. A clear plastic cover may be placed over the kit to maintain sterility.

Water Treatment Agents

Iodine, an iodinated anionic exchange resin, a resin matrix iodinated with elemental iodine, a resin containing polyiodide or silver are effective disinfectants for water borne pathogenic bacteria and viruses. Iodine is generally provided from an iodophor source or as an aqueous solution by the use of KI to aid the dissolution of iodine. Most treatments employ pHs lower or higher than about 9.

Dissolved iodine hydrolyzes in aqueous solutions to form hypoiodous acid, HOI, in amounts proportional to the pH of the solution, wherein above pH 8.5, iodine is present almost exclusively as HOI. Both dissolved $I_2$ and HOI possess antipathogenic properties. At pHs 5-7, iodine, as $I_2$, exhibits antibacterial action and at higher pHs, e.g. 7-10, HOI is an efficient virucide. Above pH 8, HOI decomposes slowly to form iodide and iodate ions, especially in the presence of dissolved iodides.

Various tinctures of iodine may be generated upon dissolving the solid in organic liquids such as ethanol, acetone, diethyl ether, toluene, p-xylene, benzene and carbon disulphide. Additionally, many organic preparations of iodine may be generated by reacting appropriate organics with iodine, e.g., iodoform, methylene iodide. Among the most popular commercial iodine-organic complexes are the PVP-iodines, iodoforms and povidone-iodine preparations, which are used as detergents and antiseptics. Most of these compounds exhibit germicidal action upon dilution in water, whereupon the iodine is hydrated and released into the water, usually as molecular iodine. Many biocidal, organic iodine compounds are commonly referred to as iodophors.

Iodine-bearing resins are made by attaching 12, tri-, penta- and hepta-iodide ions to quaternary ammonium, styrene-divinyl benzene, cross-linked anion-exchange resins. Upon elution with water, the polyiodides and iodine are released from the resin via anion-exchange mechanisms. These resins are thought to operate on a demand-type basis, where iodine will only be released in the presence of a germicidal load in the water passing through the resins, by the following mechanisms: (1) iodine release aided by an internal exchange mechanism involving 12 transfer through a polyiodide intermediate; (2) hydrolysis of iodine on the resin to produce HOI; and (3) simple release of 12 by the resin-polyiodide combination and/or organic resin matrix.

In some implementations, the metal ions used to disinfect water are silver ions, salts, or compounds. Examples of silver ion salts or compounds include, colloidal silver, silver carbonate, silver chlorate, silver perchlorate, silver phosphate, silver bromate, silver iodate, silver periodate, silver nitrate, silver nitrite, silver citrate, silver thiosulfate, silver oxide, silver peroxide, silver sulfide, silver fluoride, silver chloride, silver bromide, silver iodide, silver carboxylates, and silver protein. In other aspects, colloidal silver, silver oxide, silver phosphate, silver carbonate, silver iodate, silver citrate and silver chloride can be used as disinfectants of the water supply. It will be appreciated that other silver ions or ion salts may be used. It will also be appreciated that other metals, such as zinc, gold or copper may be used. The metal ion salts or compounds are at a low concentration that is not likely to cause damage to soft tissue or otherwise be harmful to a patient. Water continuously treated with metal ions and/or metal ion salts, or metal ion compounds, in many cases, silver ions, will be non-toxic, non-irritating, non-corrosive, and will not affect enamel or dentin bonding agents. The treated water will not have in excess of 200 CFU/ml of heterotrophic bacteria.

The water treatment of this disclosure includes treatment agents that attack not only the water-borne bacteria but also, more importantly, the biofilm bacteria. By eliminating the mature biofilm through a constant supply of an effective potable biocide, this major source of contamination is eliminated. Continuous disinfection of dental unit water lines will prevent additional biofilm growth and eventually dead bacteria will slough and the biofilm formation will be reversed. As a result, the chances of periodontal disease formation are also reduced.

Metal ion salts are administered to water reservoir systems by means of adding the metal ion salt in liquid or solid form. In various embodiments, the metal ion salt is silver sodium chloride. Concentrated solutions of ionized silver (colloidal metal) are highly light sensitive and become oxidized forming a gray to black silver oxide precipitate. Colloidal silver in concentrations generally above 10 ppm will turn yellow and become brown at even higher concentrations. A stabilized silver halide solution, for example, silver sodium chloride will remain clear to white in color at concentrations exceeding 100 ppm. The silver sodium chloride solution can be prepared into an anhydrous state by evaporating off the water. The silver sodium chloride powder can be further processed into pressed tablets. In exemplary embodiments, the concentration of metal ion in an aqueous environment is in the range of 1 ppm to 10 ppm so as to cause disinfection of existing live bacteria established in the dental unit water line. In other embodiments, the concentration of metal ion in an aqueous environment is frequently in the range of 0.02 ppm to 1 ppm so as to cause bacteriostatic conditions in the dental unit.

Exemplary embodiments of the present disclosure provide for continuous disinfection of water added to a dental unit reservoir by administering the metal ion salt into the reservoir in the liquid, powder, or tablet form. The water may be from any of the previously described sources.

In certain implementations, metal ions are continuously delivered by means of a flow through metal ion impregnated resin media. Metal ions are administered by passing source water through a water-permeable container or element having received therein a metal ion sustained release source. The metal ion sustained release source may be, for example, an amorphous soluble glass, a zeolite resin or styrene resin (e.g., an acrylic divinylbenzene structure with carboxylic exchange groups) containing metal ion(s). The amount of metal ion sustained release source required is dependent on the desired effective life span and flow rate of water. The metal ion sustained release source may be installed at the dental operatory unit plumbed directly into a municipal water source or it may be installed in the reservoir drop tube allowing for continuous treatment of batch water placed into the reservoir. A larger metal ion sustained release source may be installed at the building water source point-of-entry or within a water purification system.

Implementations described herein are included to demonstrate particular aspects of the present disclosure. It should be appreciated by those of skill in the art that the implementations described herein merely represent exemplary implementation of the disclosure. Those of ordinary skill in the art should, in light of the present disclosure, appreciate that many changes can be made in the specific implementations described and still obtain a like or similar result without departing from the spirit and scope of the present disclosure.

From the foregoing description, one of ordinary skill in the art can easily ascertain the essential characteristics of this disclosure, and without departing from the spirit and scope thereof, can make various changes and modifications to adapt the disclosure to various usages and conditions. The implementations described hereinabove are meant to be illustrative only and should not be taken as limiting of the scope of the disclosure, which is defined in the following claims.

What is claimed:

1. A cartridge for disinfecting water, the cartridge comprising
    an elongated tubular body having a first end comprising a fluid inlet, a second end opposite the first end, the second end comprising a fluid outlet, and an internal chamber disposed between the first end and the second end, the first end of the elongated tubular body comprising an end cap having a substantially circular opening in fluid communication with the fluid inlet and the internal chamber;
    a disinfectant material disposed in the internal chamber of the elongated tubular body for disinfecting water;
    a first filter disposed in the elongated tubular body adjacent to the substantially circular opening and adjacent to the disinfectant material;
    a second filter disposed in the elongated tubular body adjacent the second end and in fluid communication with the internal chamber and the fluid outlet, the second end comprising an exterior surface, the exterior surface having a tapered portion and a linear portion adjacent to the tapered portion.

2. The cartridge of claim 1, wherein the exterior surface of the second end comprises a second opening.

3. The cartridge of claim 1, wherein the linear portion of the exterior surface comprises a luer fitting for cooperating with a dental water line.

4. The cartridge of claim 1 further comprising a bottle, wherein the cartridge is placed in the bottle.

5. The cartridge of claim 1, wherein the tapered portion comprises a large diameter end and a small diameter end opposite the large diameter end, the large diameter end adjoined to the second end of the elongated tubular body, and the small diameter end adjoined to the linear portion.

6. The cartridge of claim 1, wherein the exterior surface comprises an annular wall and a nipple, the annular wall having the tapered portion and the linear portion adjacent the tapered portion, the annular wall surrounding the nipple, the nipple disposed at an end of the linear portion of the annular wall.

7. The cartridge of claim 6, wherein the annular wall is spaced from the nipple to allow a tubular member or a dental water line to be mounted to the nipple.

8. The cartridge of claim 6, wherein the annular wall further comprises threads formed on an interior surface thereof.

9. The cartridge of claim 6, wherein the linear portion of the annular wall comprises a luer fitting.

10. The cartridge of claim 6, further comprising a wire screen disposed adjacent to the second filter.

11. The cartridge of claim 1, wherein a diameter of the elongated tubular body is within a range from about 11 mm to about 17 mm.

12. The cartridge of claim 1, wherein the elongated tubular body has a length from about 120 mm to about 135 mm.

13. The cartridge of claim 1, wherein the linear portion of the exterior surface has a diameter within a range from about 5 mm to about 10 mm.

14. The cartridge of claim 1, wherein the linear portion of the exterior surface has a length from about 10 mm to about 21 mm.

15. The cartridge of claim 1, wherein the disinfectant material comprises (i) iodine, (ii) an iodinated anionic exchange resin, (iii) a resin matrix iodinated with elemental iodine, (iv) a resin containing polyiodide, or (v) silver.

16. The cartridge of claim 1, wherein the first and second filters comprise polyester, bonded foam or sponge material.

17. The cartridge of claim 6, further comprising a first dust cap configured to cover the first end and a second dust cap configured to cover the nipple of the exterior surface.

* * * * *